June 19, 1928.
A. FLETTNER
1,674,169
ARRANGEMENT FOR EXCHANGING ENERGY BETWEEN A CURRENT AND A BODY THEREIN
Filed July 18, 1924    4 Sheets-Sheet 4
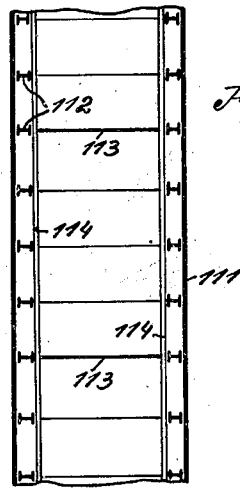
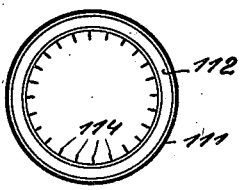
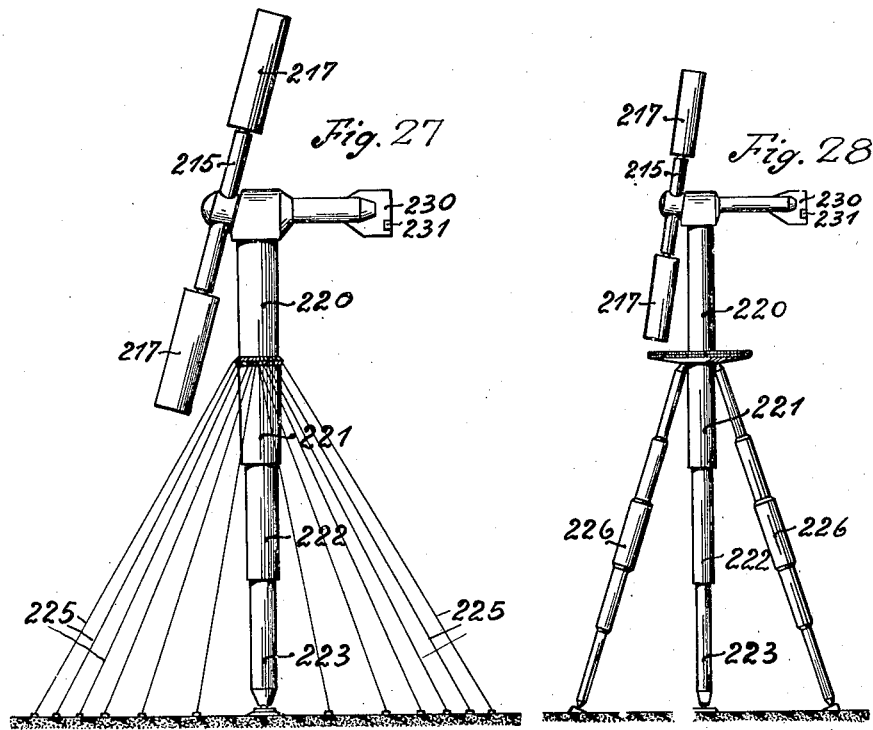

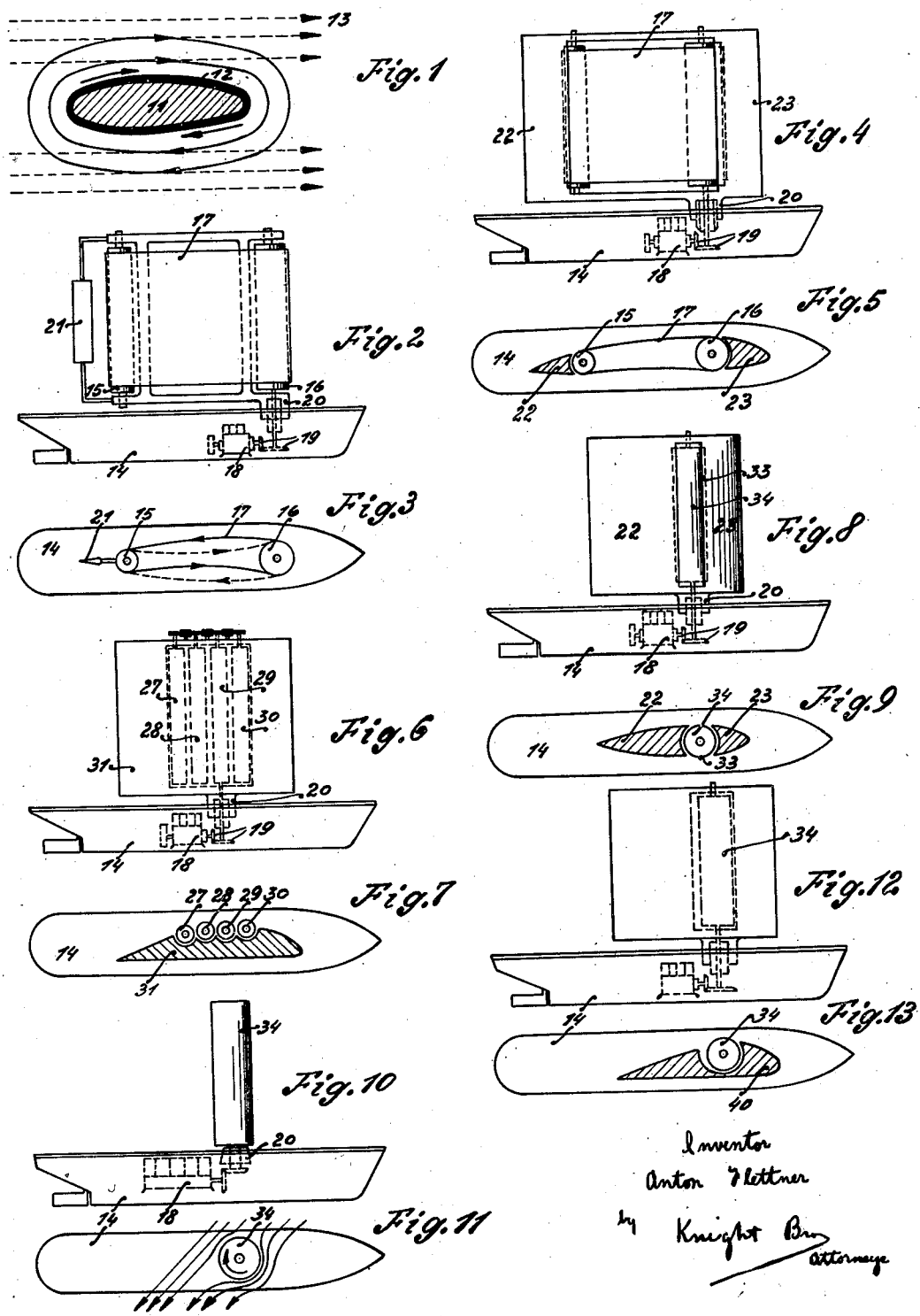

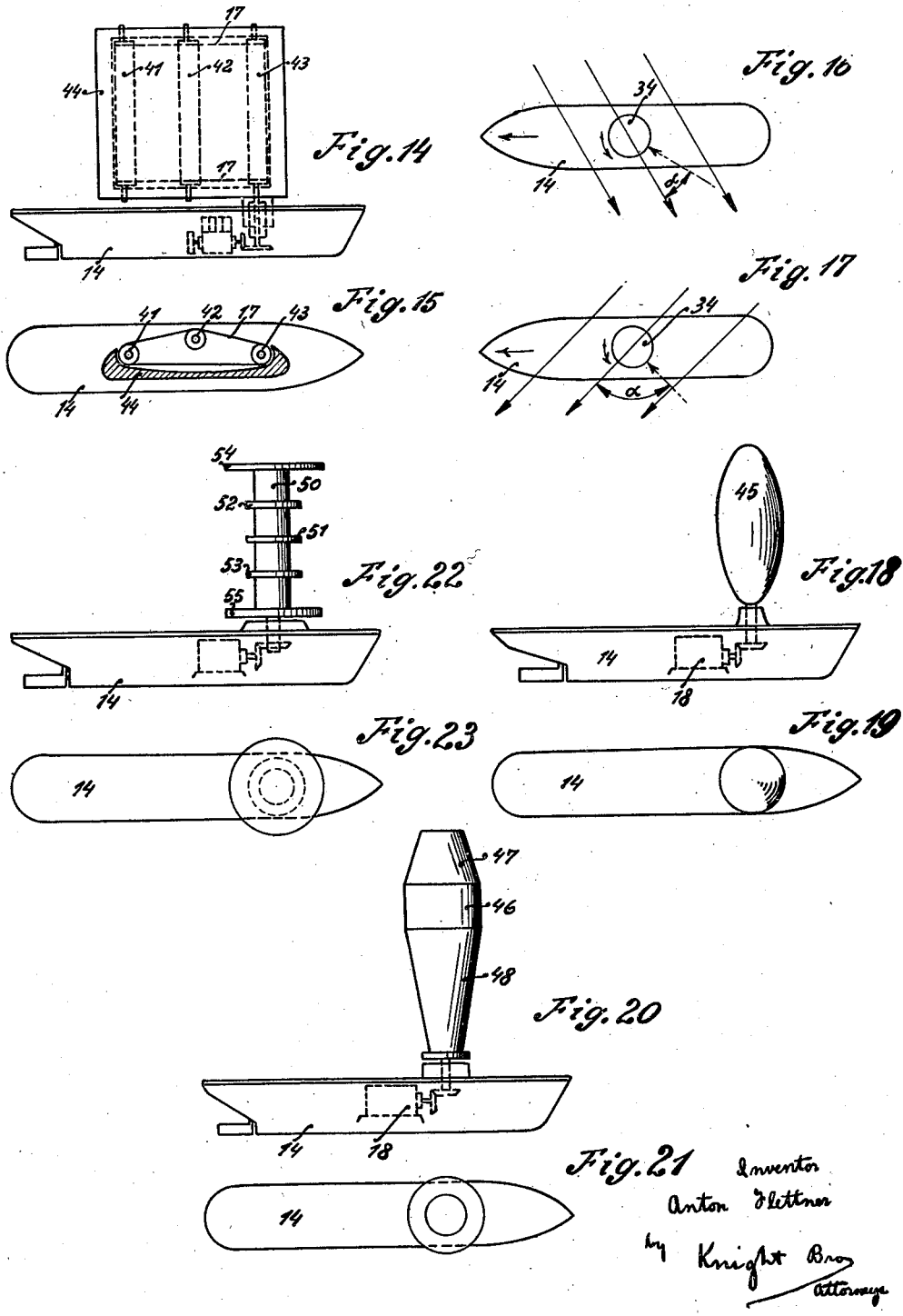

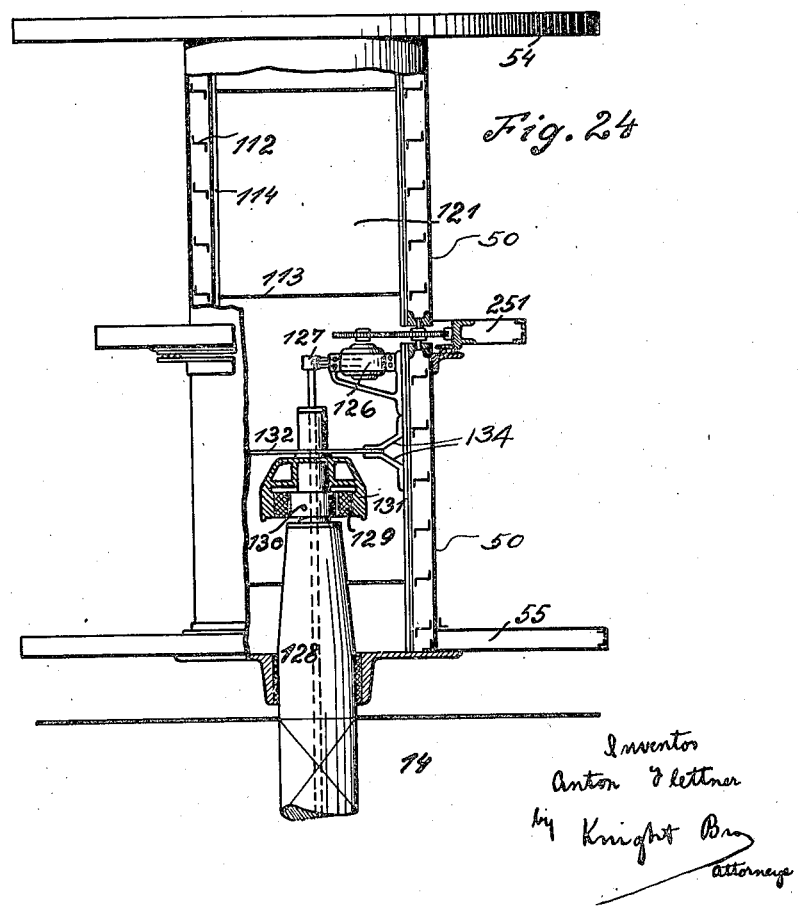

Patented June 19, 1928.

1,674,169

UNITED STATES PATENT OFFICE.

ANTON FLETTNER, OF BERLIN, GERMANY, ASSIGNOR TO N. V. INSTITUUT VOOR AERO- EN HYDRO-DYNAMIEK, OF AMSTERDAM, A DUTCH CORPORATION.

ARRANGEMENT FOR EXCHANGING ENERGY BETWEEN A CURRENT AND A BODY THEREIN.

REISSUED

Application filed July 18, 1924, Serial No. 726,825, and in Germany July 28, 1923.

My invention relates to bodies located in a medium current which are to transmit energy from the current to an object utilizing this energy, such as a sail on a ship converts the energy of wind for moving the ship or the blades of a wind-mill utilize the energy of the wind to drive the mill.

The principal objects of my invention are improved arrangements for driving a body by means of the energy of flow. According to my invention the transverse propulsion force, resulting from the energy of flow such as the wind, in ships, is effected on the basis of actions of the nature of the magnus effect by means of surfaces moving in the direction of their extent, or by means of surfaces, the skin of which moves in the direction of its extent, round the surfaces, and which surfaces operate in the flow of the fluid medium such as air or water.

Especially the skin or the border of that body or element on which acts the flow, is predominantly moved within its shape on that side of the element and adjacent to the flow and in the direction of the flow, on which, for the purpose of the magnus effect, a vacuum is to be produced, pulling said element substantially transverse to the medium flow.

On account of this transverse driving action such a body may be designated a transverse drive body.

The accompanying drawings show how the invention can be put into practice:

Fig. 1 is a diagram illustrating the relative movement between a current and a body with movable skin;

Figs. 2 and 4 show in side elevations, and Figs. 3 and 5 in respective plan views, the arrangement of a broad roller-guided ribbon for driving ships;

Figs. 6, 8, 10 and 12 show in side elevations, and Figs. 7, 9, 11 and 13 in respective plan views, arrangements in which cylinders serve as bodies with movable skin; parts of the outer surface in the arrangements of Figs. 6 to 9 inclusive, 12 and 13 being covered while in the arrangements of Figs. 10 and 11 the cylinder rotates freely in the current;

Figs. 14 and 15 are respectively a side elevation and a plan view of the arrangement of a movable ribbon the outer surface of which is partly covered toward the current;

Figs. 16 and 17 show diagrams of the power distribution on a ship driven by means of a rotary cylinder;

Figs. 18, 20 and 22 show in side elevations, and Figs. 19, 21 and 23 in respective plan views, arrangements of bodies with rotary skin, in which by the particular design of the body positive desired speed distributions over the length of the driving body in a ship's drive are attained;

Fig. 24 shows the detailed construction and the driving mechanism of a rotary cylinder;

Figs. 25 and 26 are respectively a longitudinal section and a cross-section through a tall projecting construction; and Figs. 27 and 28 are side views of a wind power station, in two different forms of construction.

The drawings illustrate appropriate examples only for carrying the invention into practice; other constructions and modes of applications within the scope of the invention being possible.

The general principle is first to be explained with reference to Fig. 1, in which 11 may represent any plain body, for instance, the sail of a ship, or the driving surface or sail of a current operated device. If the skin or border surface 12 of said body is moved in the current 13, in the direction of the full line arrows shown adjacent thereto, it will be seen that the skin on the upper side of the body moves in the direction of the current indicated by the dotted lines while the skin on the underside of the body moves in opposite direction thereto. This means an aiding of the current on the upper side and an opposition to the current on the underside of the body. Thus, if the body moves opposite to the current or, vice versa, if the current moves opposite to the body, with the regular symmetric design of the body, a considerably lower pressure, i. e. partial vacuum, is produced on the upper side while an increased pressure is produced on the underside of the body, so that a strong pressure transverse to current 13 results therefrom. This pressure difference is utilized for exchanging energy between a current and a body in the direction actually desired.

In Figs. 2 to 9 inclusive, examples of arrangements are shown for moving the skin of the body around the latter. In the arrangement shown in Figs. 2 and 3, on a ship 14 two rollers 15, 16 are located around which a band 17 is loosely placed. The roller 16 may be rotated from any power source 18 over the gearing 19 in such a way that it moves in the direction of the arrows shown by full lines. The loosely stretched band forms then by action of the low pressure produced during its movement a profile shape corresponding to the current in one direction. If the band 17 is moved in the opposite direction indicated by the dotted arrows, the profile shape in the other direction is formed. The band can be made of any appropriate material such as fabric, leather, flexible metal, or the like. The system of planes consisting of rollers and band is rotatably mounted in an appropriate bearing 20. Depending on the direction in which the transverse pressure or drive produced on the system of planes is to be used for driving the ship, the system of planes is turned either directly from the ship or by means of auxiliary planes, or by means of auxiliary planes 21 constructed like Flettner auxiliary planes and controlled either directly on the spot or from any other convenient place of the ship.

Figs. 4 and 5 show an arrangement, in which for improving the profile shape produced by the loose band, separate profile pieces 22, 23 are made to adjoin or form an extension of said profile shape. In some cases it will be preferable to use only one or the other of said separate profile pieces. Instead of one moving skin forming an endless band, a plurality of skin elements 27, 28, 29, 30 (Figs. 6 and 7) may be employed. As the effect on the low pressure side is the stronger one, it suffices, for producing a vigorous transverse drive, to move the skin on that side of the body only on which the low pressure is to be produced. Such an arrangement is also represented in Figs. 6 and 7, in which the rollers 27, 28, 29, 30 are covered by means of a profile piece 31 on the side opposite to the low pressure side.

Figs. 8 and 9 show a further simplification of the arrangement by employing as movable skin the wall 33 of a cylinder 34, which for instance is turned in the direction of the arrow (Fig. 11) if the low pressure is to be produced on the front side of the body. Profile pieces 22, 23, or one of them only, may be provided to adjoin said cylinder, it being however sufficient to use cylinders only. If such cylinders are used as sails of a ship, with different wind directions a forward or backward movement of the ship in the desired direction can be produced depending on the rotary direction imparted to the cylinder. Of course as already described with reference to Figures 2 and 3, the profile pieces 22, 23 are rotatable as a unit on a separate pivot 20, the same as the sail body 17 in Figures 2 and 3 rotates on its pivot 20, in order to adjust it according to the wind direction. In Figs. 10 and 11, 14 designates again a ship, 34 a driving cylinder. The latter can be rotated as a whole, or its envelope (skin) only may be rotated, and it can be subdivided in its height and be collapsible in telescopic fashion. If cylinders with adjoining profile pieces, for instance a cylinder 34 with a tail profile piece 22 only, are employed, such as sails, said adjoining profile pieces may be steered by using the current forces with the aid of auxiliary planes, for instance auxiliary rudders, similar to the arrangement shown in Fig. 2. Also in all other cases, plain bodies with movable skin can be controlled and secured in their working or inoperative positions by means of auxiliary rudders.

Particularly advantageous effects of the surfaces with movable skin can be attained if the skin is moved on that side of the body in contact with the current on which, according to the magnus effect, the low pressure is to be produced. On the high pressure side the movable band or the cylinder wall is preferably covered or placed within a profile body.

Arrangements of this kind are shown in Figs. 6, 7, 12, 13, 14, 15. Figs. 12 and 13 show a cylinder 34 rotating within an unsymmetrical stream line body 40. The gap between cylinder 34 and cover 40 forms preferably a tapered channel. Figs. 14 and 15 show a movable band 17 guided by means of three rollers 41, 42, 43 and located in a symmetric stream line body 44. Of course, other covers may be used. In all these cases, a current along the skin is produced which results in a very strong transverse drive or propulsion. The latter occurs intensely even when the system of planes is not yet moved to any working angle relatively to the medium.

Thus, by covering parts of the rotary skin, for instance by adjoining pieces having a stream line contour, a directional effect on the low pressure range can be attained, that is the low pressure range, with reference to the current relatively to the body with rotary skin, can be located at any desired place.

According to the adjusting of the adjoining pieces 22, 23 or the tail piece 22 only in Figs. 8 and 9 with reference to the current, for instance by means of auxiliary surfaces, transverse driving action may be produced in one or the other direction. Thus for instance a sail body fitted with the improved arrangement will receive a more or less vigorous driving action in one or the other direction according to the relative position given to the profile pieces with reference to the direction of the wind, as will be further explained hereinafter with reference to Figs. 15 and 16.

This invention relates to a further development of the propulsion arrangement described for the purpose of advantageously shaping the vacuum region on the transverse propulsion member, for example, on solid rotary bodies or those having a rotating skin. The shaping of the vacuum region on the transverse propulsion member may be effected in various ways, for example, either by giving the vacuum region a definite direction such as come into consideration for the direction of the drive or of travel for the time being desired, or by predetermining or distributing or regulating the vacuum region over the transverse propulsion body or the rotary solid itself in any desired manner, lengthwise for instance, or in some other way.

This predetermination of the vacuum region may be obtained by regulating the ratio of skin velocity to current in accordance with the desired conditions. For the purpose of regulating this ratio the propulsion velocity of the moving surface member or of the moving skin may be variable. Zones of skin velocities differing from one another may be also provided. This may be obtained by the construction of the surface member so that a commonly driven transverse propulsion member shows zones of differing circumferential speeds, according to the shape of its zones. Or the transverse propulsion member may be subdivided into several portions or zones driven at speeds differing from each other and regulated separately, so that different circumferential speeds of the zones may be obtained and the ratio of skin velocity to current velocity be altered in accordance with the desired conditions.

Figs. 16 and 17 show a sailing ship 14, on which a rotary driving cylinder 34 is provided. In the example shown in Fig. 16 the ship sails obliquely against the wind, and in the example shown in Fig. 17 it sails obliquely before the wind, as shown by the arrows indicating the apparent wind direction. In order to sail in the direction indicated by the position of the ship, the angle α between the resultant transverse propulsion force and apparent wind must decrease from the wind direction of Fig. 17 to the wind direction of Fig. 16. Thus, in order to adjust the direction of the propulsion, the initial speed of the rotary body or of the rotating skin must be changed correspondingly to the wind direction.

By a change of the relative speed of the rotary body, the low pressure range is displaced on the rotary body with reference to the direction of the current, as has been proven by experiments.

In order to attain, for instance, with the wind direction of Fig. 16 a smaller angle α between the resultant transverse propelling force and the apparent wind, with certain ratios between current velocity and peripheral speed the revolving body should be driven at a lower peripheral speed, while with the wind directed as shown in Fig. 17 a higher peripheral speed will be chosen. With peripheral speeds which are great as compared with the velocity of the flow, the opposite conditions hold good.

If the wind blows, instead of from starboard, from port, only the rotary direction of the body must be changed, as described in detail above.

The low pressure area for producing the transverse drive can thus be so adjusted with reference to body and current that it assumes definite angular positions with reference to the axis of the rotary body.

Under certain conditions it may be also desirable to give to the vacuum area certain positions and extents measured at the periphery of a section on meridian of the rotary body. This may be the case when it is found that the vacuum area is unevenly distributed over the length of the rotary body. Thus for instance it may be less at the ends through being fed from the layers of higher pressure air in the vicinity, but also because the rapidly moving layers of current on the rotating body rub against the stationary layers.

In order to equalize inequalities of the low pressure range over the length of the rotary body or to increase the low pressure at definite regions, or to adjust the low pressure range at will, for instance a cylindrical or other rotary body may be divided into zones of different shapes which are driven at different speeds. Thereby, a gradual transition from the outer non-influenced layers to the layers of lowest pressure production can be effected.

Figs. 18, 19, 20, 21 show some constructional forms for producing this effect. If the rotary body is tapered at one or both ends, by giving the body 45 of Figs. 18 and 19 for example an elliptical shape, or a cylindrical shape with parabolic or elliptical head so that zones of different diameters are created on the body which rotate at different circumferential speeds, if the entire element is rotated at uniform angular speed over its whole length. Thus the ratio of circumferential speed to the velocity of the current is gradually increased towards the side or towards the bottom, so that losses due to friction between areas of flow having different velocities are reduced. It is not essential to shape the meridian curve as a continuous curve, but it may consist of individual truncated portions as shown in Figs. 20, 21, in which the rotary body consists of a cylindrical middle portion 46 and two truncated cone ends 47, 48. The contour of the rotary body may also be stepped off towards the ends so that the body is bounded by imaginary cone envelopes or cylinder sections of different diameters.

In the case of transverse drive bodies which, owing to their dimensions extend into zones of different velocity of the current as, for instance, the sails of a wind-mill, for example 217 in Fig. 27, in which the travelling speed of the sail is greater at the top than at the base, or in the instance of sails of a sailing ship in which a greater wind velocity must be reckoned with towards the top, the meridian section can be chosen over the length of the rotary body so that over the whole length of the revolving body or a part of it the ratio of circumferential speed to current velocity is constant or practically constant.

In case of a sail for a ship the section of the revolving body therefore becomes larger from the base towards the top as shown at 48 in Fig. 20.

In this figure the meridian curve is chosen so that a gradual change of that ratio from that enlarged part of 48 to the upper base plate is obtained by shaping the top of the body as a truncated cone, with a cylindrical part 46 inserted between the top 47 and the main lower portion 48 of the body.

Fig. 21 shows a top view of the sailing ship of Fig. 20.

Figs. 22 to 24 show a different way of arranging different zones of the skin rotatable at different circumferential speeds. In this example the zones comprise parts salient from other parts by providing for instance on a cylindrical rotary body annular members or discs of larger diameter than the body.

This means may be used in order to equalize lack of uniformity in the vacuum zone over the length of the rotary body or to increase the vacuum in certain zones.

These annular members may be driven at the same angular velocity as the body of revolution or the skin of the same, the ratio of their circumferential velocity to the velocity of current then being a greater one than at the other parts, so that they may influence the adjacent area of the current in some different desired way than the other parts of the travelling skin so that the pulling or transverse driving action due to the magnus effect can be adjusted or predetermined in any desired way.

For the purpose of adjusting and predetermining the vacuum zone on the transverse propulsion element to any desired extent, these discs or annular members serving as zones adapted to be rotated at different circumferential speeds may also be driven at angular speeds different from that of the rotary body or its skin and may be regulated in their speeds, for example, by means which will be described later on with reference to Fig. 24.

If, for instance, for the driving body 50 of the vessel 14 of Figs. 22 and 23, it is desired to increase the low pressure zone of the middle portion, a ring 51 must be arranged which effects an increase of the inflowing current owing to the magnus effect, and thus of the transverse drive at this place. If a plurality of such rings or discs, for instance 52, 53, 54, 55 are arranged, the low pressure zone can be kept uniform over the whole length of the rotary body, by rings of higher circumferential speed preventing deterioration of the low pressure zone toward the ends of the rotary body, and also by causing the zones bounded by adjacent rings or discs to impart an increased speed to a larger volume of current than corresponds to the working range of the skin itself.

A further cause for thus increasing the low pressure effect lies in the fact that by the projecting rings or discs the influence of the centrifugal force on the current is increased.

If only the end layers of the current moved by the rotating skin, owing to the magnus effect, are to be protected against the adjacent non-influenced current, it suffices to only provide the two end discs 54, 55. By the latter, at the ends of the rotary body strongly accelerated zones are created which prevent a deterioration of the low pressure and at the same time reduce the friction between adjacent air layers, as the discs rotating at high peripheral velocity cause an increased flow towards these discs, while on the other hand they accelerate also the outer adjacent current so that a gradual transition from the non-influenced layers to the influenced ones is created without the efficiency of the low pressure range being impaired thereby. Under certain conditions it may be desirable to drive the rings or discs at an angular speed different from that of the adjacent skin or of the adjacent skin sections, for instance at higher speeds. Furthermore, the sections of the rotary body created by said rings or discs can be driven at different speeds. This can be effected by means of an appropriate mechanical device, for instance differential gearing. The constructional features of a cylinder serving for example for a sail of a ship such as 34 in Figs. 8 to 13 or 16 to 17 or 50 in Fig. 22 or serving for a propeller of a wind mill 217 such as shown in Figs. 27 and 28 are shown in Figs. 24 to 26.

The cylinder is preferably composed of a shell or mantle 111 of thin material such as sheet metal. Horizontal rings 112 or strutting plates 113 serve for strengthening the envelope 111 against bending. These rings are preferably of such a cross-section that they have a bending resistance in horizontal direction. The bending strength in vertical direction is immaterial because the rings are secured against bending in this direction by the cylinder walls. The rings may, however, also receive increased breaking strength, by making the same of an I-shaped or Z-shaped cross-section. If it is desired to also increase their strength in vertical direction, they may be fitted at their free edges, as shown in Figs. 24–26, with vertical stays 114 of flat material, of which the longer side of the cross-section is radially directed, so that these construction elements have a greater bending resistance against yielding in radial direction as well as in vertical direction.

In the example of Fig. 24 the cylinder is fitted with two end rings 54, 55 fixedly connected with the skin of the cylinder while a middle ring 251 may be driven at an adjustable speed independently from the cylinder. The main cylinder 121 is mounted on a pivot 128 and is driven by an electric motor 129, 130, 131. One part of the electric motor, for instance the armature, may be keyed on the pivot. The other part, for instance the field 131 may be appropriately connected with the envelope of the cylinder, for instance by an elastic and resilient plate 132 and brackets 134 so that a reliable mounting of the cylinder is insured. The current for the motor may be supplied from the engine room of the ship through a bore of the pivot 128.

For independently driving the annular members 251, a second electric motor 126 and a gearing are arranged, which drive the annular member 251, which latter is supported by a ball-bearing fixed to the envelope of the cylinder. Current is supplied to the motor 126 by slip rings 127 and the bore of the pivot. By means of this motor or other appropriate gearing the circumferential velocity of the annular member may be regulated or adjusted conveniently relatively to the circumferential velocity of the cylinder.

The invention has been explained as to transverse driving members for sailing ships. As already mentioned it is, however, also applicable to other transverse driving bodies, such as driving planes for current operated devices, for example wind-mills or propellers or impellers.

Two examples of this latter mode of application are represented in Figs. 27 and 28. The wings 217 of a wind-mill arranged on spokes 215 consist of bodies having a movable skin or of rotary cylinders or of any other form of a transverse drive body just as described before with reference to Figs. 1 to 24. The wing system is revolubly mounted on the tower 220, and it can be adjusted by means of an appropriate vane 230, for instance by means of a Flettner fin 231. The propellers 217 are rotated on their own longitudinal axis by suitable means provided in the interior of stationary body 220 and not shown here, being immaterial so far as the present invention is concerned. It may be accomplished by any suitably geared motor drive, well within the province of one skilled in the art of mechanical engineering. Such a tower 220 may be constructed in a manner known in art; it may be also constructed in a similar way as the thin-walled cylinders shown in Figs. 24 to 26. It may consist of separate parts 220, 221, 222, 223 of stepwise diminished diameters, the largest diameter of the tower being thus at the top where the energy transforming device is located. In the example shown in Fig. 27, this tower is held in position by means of guy ropes 225, and in the example shown in Fig. 28 by means of struts 226 of similar construction to that of the tower, the diameter of these struts being decreased from the middle, where the highest bending strength is required, in upward and downward directions.

What I claim is:—

1. In an arrangement for driving a body by means of the energy of a flowing medium in combination an object for utilizing the energy of flow, an element having a shape suitable to produce the magnus effect carried by said object, means for moving at least the border surface of said element within its shape on that side of the element adjacent to the medium and in the direction of flow, on which side, due to the magnus effect, a vacuum is to be produced for pulling said element substantially transverse to the medium flow.

2. In combination a ship, a sail body having a shape suitable to produce the magnus effect for sailing the ship by means of the wind, means for revolving said sail body within its own shape on that side of the sail body in the direction of the flow, on which side, due to the magnus effect a vacuum is to be produced, for pulling said sail substantially transverse to the wind.

3. In an arrangement for driving a body by means of the energy of a flowing medium through the magnus effect in combination an object for utilizing the energy of the flow, at least one cylinder carried by said object, means for revolving at least the cylinder skin within the shape of said cylinder on that side of the cylinder adjacent to the flow and in the direction of the flow on which side, due to the magnus effect, a vacuum is to be produced for pulling said cylinder substantially transverse to the medium.

4. In combination a ship, a sail body comprising at least one cylinder for sailing the ship by means of the wind through the magnus effect and means for revolving at least the skin of said cylinder around the axis of the cylinder on that side of said cylinder in the direction of the flow on which side, due to the magnus effect, a vacuum is to be produced for pulling said cylinder substantially transverse to the wind.

5. In an arrangement for driving a body by means of the energy of a flowing medium in combination an object for utilizing the energy of the flow through the magnus effect, at least one cylinder carried by the object, means for moving at least the envelope of said cylinder around said cylinder on that side of the cylinder adjacent to the flow and in the direction of the flow on which side, due to the magnus effect, a vacuum is to be produced for pulling said cylinder substantially transverse to the medium flow.

6. In combination a ship, a sail body comprising at least one cylinder for sailing the ship by means of the wind through the magnus effect, a pivot on the ship for carrying said cylinder, an engine for revolving at least the envelope of said cylinder around its axis with variable speeds.

7. In an arrangement for driving a body by means of the energy of a flowing medium, in combination an object for utilizing the energy of the flow through the magnus effect, at least one rotary cylinder for driving said body, a pivot, an electric motor for driving at least the envelope of said cylinder, one part of said electric motor being firmly connected with said pivot and its other relatively movable part being suspended from the envelope of said cylinder.

8. In combination a ship, a sail body comprising at least one cylinder for sailing the ship by means of the wind through the magnus effect, a pivot on the ship for carrying said cylinder, an electric motor for driving at least the envelope of said cylinder, one part of said electric motor being firmly connected with said pivot and its other relatively movable part being suspended from the envelope of said cylinder.

9. In an arrangement for driving a body by means of the energy of a flowing medium through the magnus effect, in combination an object for utilizing the energy of flow, at least one rotary cylinder for driving said body, a pivot, an electric motor for driving at least the envelope of said cylinder, one part of said electric motor being firmly connected with said pivot and its other relatively movable part being elastically suspended from the envelope of said cylinder.

10. In combination a ship, a sail body comprising at least one cylinder for sailing the ship by means of the wind through the magnus effect, a pivot on the ship for carrying said cylinder, an electric motor for driving at least the envelope of said cylinder, one part of said motor being firmly connected with said pivot and its other relatively movable part being elastically suspended from the envelope of said cylinder.

11. In an arrangement for driving a body by means of the energy of a flowing medium through the magnus effect, in combination an object for utilizing the energy of the flow, at least one rotary cylinder for driving said body, a pivot, an electric motor for driving at least the envelope of said cylinder, one part of said motor being firmly connected with said pivot, a horizontal plate strutted within the envelope of said cylinder, and having the other relatively movable part of the motor fixed to it.

12. In combination a ship, a sail body comprising at least one cylinder for sailing the ship by means of the wind through the magnus effect, a pivot on the ship for carrying said cylinder, an electric motor for driving at least the envelope of said cylinder, one part of said motor being firmly connected with said pivot, a horizontal plate strutted within the envelope of said cylinder and having the other relatively movable part of the motor fixed to it.

13. In an arrangement for driving a body by means of the energy of a flowing medium through the magnus effect, in combination an object for utilizing the energy of the flow, an element carried by said object, the skin of said element comprising different zone portions rotatable within their respective shapes at different circumferential speeds, means for rotating said zone portions on that side of the element in the direction of the flow on which side, due to the magnus effect, a vacuum is to be produced for pulling said element substantially transverse to the medium flow.

14. In an arrangement for driving a body by means of the energy of a flowing medium, in combination an object for utilizing the energy of the flow, an element having a shape suitable to produce the magnus effect carried by said object, having at least its skin movable within its own shape, rings projecting from said skin, means for moving the zone portions of said skin within their shapes on that side of the element in the direction of the flow on which side, due to the magnus effect, a vacuum is to be produced for pulling said element substantially transverse to the medium flow.

15. In an arrangement for driving a body by means of the energy of a flowing medium, in combination an object for utilizing the energy of the flow, an element having a shape suitable to produce the magnus effect carried by said object, at least the skin of said element being movable within its own shape, means for moving the skin, projecting rings on said skin, means for moving said rings within their shapes at an angular velocity differing from the angular velocity of the skin in the vicinities of said rings, said movements being on that side of the element in the direction of the flow, on which side, due to the magnus effect, a vacuum is to be produced for pulling said element substantially transverse to the medium flow.

16. In an arrangement for driving a body by means of the energy of a flowing medium, in combination an object for utilizing the energy of the flow, an element having a shape suitable to produce the magnus effect carried by said object, at least the skin of said element being movable within its own shape, means for moving the skin, projecting rings on said skin, gearings for moving said rings within their shapes at an angular velocity differing from the angular velocity of the skin, said movements being on that side of the element in the direction of the flow on which side, due to the magnus effect, a vacuum is to be produced for pulling said element substantially transverse to the medium flow.

17. In an arrangement for driving a body by means of the energy of a flowing medium, in combination an object for utilizing the energy of the flow, an element having a shape suitable to produce the magnus effect carried by said object, at least the skin of said element being movable within its own shape, means for moving the skin, projecting rings on said skin, at least one electric motor for separately driving said rings within their shapes at variable speeds independently of said skin, said movements being on that side of the element in the direction of the flow on which side, due to the magnus effect, a vacuum is to be produced for pulling said element substantially transverse to the medium flow.

18. In an arrangement for driving a body by means of the energy of a flowing medium, in combination an object for utilizing the energy of the flow, an element having a shape suitable to produce the magnus effect carried by said object, at least the skin of said element being movable within its own shape, projecting end discs fixed on said skin, means for moving the skin within its shape on that side of the element in the direction of the flow on which side, due to the magnus effect, a vacuum is to be produced for pulling said element substantially transverse to the medium flow.

19. In combination a ship, a sail body comprising at least one cylinder for sailing the ship by means of the wind through the magnus effect, an engine for revolving at least the envelope of said cylinder around its axis at variable speeds and projecting discs fixed to the ends of said cylinder and adapted to revolve with the latter.

20. A wind motor, comprising a rotatable frame, one or more rotating cylinders carried by said frame, and means for rotating said cylinder or cylinders about their respective axes.

21. A wind motor, comprising a stationary base, a member rotatably mounted on a vertical axis on said base, a vane on said member to fix its angular position relative to the wind direction, a frame rotatable relatively to said member and said base, one or more rotatable cylinders carried by said frame, and means for causing rotation of said cylinder or cylinders about their respective axes when said frame is rotated.

22. In a rotor propeller, a main driving shaft directed in the line of proposed movement, a plurality of auxiliary shafts mounted radially with regard to said main shaft and carried in revolution therewith, a plurality of bodies having surfaces of revolution formed by rectilinear generatrices and each mounted for individual rotation about the axis of one of said auxiliary shafts, means to cause said bodies to rotate during the movement of revolution with said main shaft, and means on each of said bodies to prevent the spilling of fluid over the ends of the bodies under the effect of forces arising during said revolution.

23. A wind motor comprising a supporting frame, a rotatable shaft therein, a plurality of radial axes attached to said shaft, a conical wind engaging member tapering toward said shaft rotatably mounted on each of said axes, and means for rotating said members.

24. A wind motor comprising a supporting frame, a rotatable shaft therein, a plurality of radial axes attached to said shaft, a conical wind engaging member tapering toward said shaft rotatably mounted on each of said axes, means for rotating said members, and means for maintaining the plane of the axes of said wind engaging members approximately normal to the direction of the wind.

In testimony whereof I have hereunto set my hand.

ANTON FLETTNER.